US009719585B2

(12) United States Patent
Sten

(10) Patent No.: US 9,719,585 B2
(45) Date of Patent: *Aug. 1, 2017

(54) AXLE ASSEMBLY WITH TORQUE DISTRIBUTION DRIVE MECHANISM

(71) Applicant: eAAM Driveline Systems AB, Trollhättan (SE)

(72) Inventor: Erik J. Sten, Trollhättan (SE)

(73) Assignee: e-AAM Driveline Systems AB, Trollhättan (SE)

(*) Notice: Subject to any disclaimer, the term of this patent is extended or adjusted under 35 U.S.C. 154(b) by 253 days.

This patent is subject to a terminal disclaimer.

(21) Appl. No.: 14/469,972

(22) Filed: Aug. 27, 2014

(65) Prior Publication Data
US 2014/0364264 A1    Dec. 11, 2014

Related U.S. Application Data

(63) Continuation of application No. 13/835,043, filed on Mar. 15, 2013, now Pat. No. 8,998,765, which is a
(Continued)

(51) Int. Cl.
F16H 48/08    (2006.01)
F16H 37/08    (2006.01)
(Continued)

(52) U.S. Cl.
CPC .......... *F16H 37/082* (2013.01); *B60K 1/00* (2013.01); *B60K 17/165* (2013.01);
(Continued)

(58) Field of Classification Search
CPC .......... B60K 17/165; B60K 2001/001; F16H 37/082; F16H 48/05; F16H 48/08;
(Continued)

(56) References Cited

U.S. PATENT DOCUMENTS 5,518,463 A    5/1996 Shibahata et al.
5,696,680 A    12/1997 Ichioka et al.
(Continued)

FOREIGN PATENT DOCUMENTS

DE    102005025617    12/2006
DE    102006031089    1/2008
(Continued)

OTHER PUBLICATIONS

Wheals, J.C., Baker, H., Ramsey, K., Turner, W., "Torque Vectoring AWD Driveline: Design, Simulation, Capabilities and Control," SAE Transactions, 113(6):557-576, 2004.
(Continued)

Primary Examiner — Roger Pang
(74) Attorney, Agent, or Firm — Harness, Dickey & Pierce, P.L.C.

(57) ABSTRACT

An axle assembly with a differential assembly, a housing and a transmission. The transmission has a first and second planetary gearsets that have associated (i.e., first and second) ring gears, planet carriers and sun gears. The first planet carrier is coupled to a differential carrier of the differential assembly for common rotation. The second ring gear is non-rotatably coupled to the housing. The second planet carrier is coupled to the second differential output for common rotation. The second sun gear is coupled to the first sun gear for common rotation.

21 Claims, 11 Drawing Sheets

Related U.S. Application Data continuation-in-part of application No. 13/182,153, filed on Jul. 13, 2011, now Pat. No. 8,663,051.

(60) Provisional application No. 61/468,809, filed on Mar. 29, 2011, provisional application No. 61/364,072, filed on Jul. 14, 2010.

(51) Int. Cl.

| *F16H 48/36* | (2012.01) |
|---|---|
| *B60K 1/00* | (2006.01) |
| *B60K 17/16* | (2006.01) |
| *F16H 48/05* | (2012.01) |
| *F16H 48/22* | (2006.01) |
| *B60L 15/20* | (2006.01) |
| *F16H 48/24* | (2006.01) |

(52) U.S. Cl.
CPC .......... *B60L 15/2054* (2013.01); *F16H 48/05* (2013.01); *F16H 48/08* (2013.01); *F16H 48/22* (2013.01); *F16H 48/36* (2013.01); *B60K 2001/001* (2013.01); *B60L 2240/423* (2013.01); *B60L 2240/507* (2013.01); *F16H 48/24* (2013.01); *F16H 2048/364* (2013.01)

(58) Field of Classification Search
CPC .......... F16H 48/22; F16H 48/36; F16H 48/24; F16H 2048/364
USPC ................. 475/204, 205, 150, 151, 221, 225
See application file for complete search history.

(56) References Cited

U.S. PATENT DOCUMENTS

| 6,098,737 | A | 8/2000 | Aoki |
|---|---|---|---|
| 6,105,704 | A | 8/2000 | Hamada et al. |
| 6,120,407 | A | 9/2000 | Mimura |
| 6,325,736 | B1 | 12/2001 | Hamada et al. |
| 6,540,636 | B2 | 4/2003 | Amanuma et al. |
| 6,595,308 | B2 | 7/2003 | Bowen |
| 6,609,993 | B2 | 8/2003 | Ohkubo et al. |
| 6,863,636 | B2 | 3/2005 | Huber et al. |
| 6,909,959 | B2 | 6/2005 | Hallowell |
| 7,044,880 | B2 * | 5/2006 | Bowen ............... B60K 23/0808 180/248 |
| 7,216,732 | B2 | 5/2007 | Angerer et al. |
| 7,238,140 | B2 | 7/2007 | Gradu |
| 7,270,205 | B2 | 9/2007 | Sakai et al. |
| 7,491,147 | B2 | 2/2009 | Ross |
| 7,553,251 | B2 | 6/2009 | Nett et al. |
| 7,801,657 | B2 | 9/2010 | Piyabongkarn et al. |
| 7,867,125 | B2 | 1/2011 | Kim et al. |
| 7,873,454 | B2 | 1/2011 | Piyabongkarn et al. |
| 7,874,395 | B2 | 1/2011 | Taji et al. |
| 8,049,384 | B2 | 11/2011 | Wilton et al. |
| 8,651,991 | B1 * | 2/2014 | Sten .................. F16H 48/30 475/150 |
| 8,663,051 | B2 * | 3/2014 | Sten .................. F16H 48/36 475/150 |
| 8,998,765 | B2 * | 4/2015 | Sten .................. F16H 48/36 475/150 |
| 2002/0061801 | A1 | 5/2002 | Amanuma et al. |
| 2002/0077217 | A1 | 6/2002 | Presley |
| 2003/0203782 | A1 | 10/2003 | Casey et al. |
| 2004/0048710 | A1 | 3/2004 | Tumback |
| 2004/0069542 | A1 | 4/2004 | Simmons et al. |
| 2005/0006164 | A1 | 1/2005 | Teraoka |
| 2005/0176546 | A1 | 8/2005 | Fujita et al. |
| 2006/0025273 | A1 | 2/2006 | Gradu |
| 2006/0079370 | A1 | 4/2006 | Kushino |
| 2006/0276292 | A1 | 12/2006 | Puiu |
| 2007/0060432 | A1 | 3/2007 | Van Druten et al. |
| 2007/0087889 | A1 | 4/2007 | Rosemeier et al. |
| 2007/0135255 | A1 | 6/2007 | Kim et al. |
| 2007/0213162 | A1 | 9/2007 | Takasaki |
| 2007/0249456 | A1 | 10/2007 | Meixner |
| 2007/0256869 | A1 | 11/2007 | Kozarekar |
| 2007/0259749 | A1 | 11/2007 | Ross |
| 2007/0265130 | A1 | 11/2007 | Bowen |
| 2008/0064552 | A1 | 3/2008 | Tangl |
| 2008/0113842 | A1 | 5/2008 | Kinoshita et al. |
| 2008/0176702 | A1 | 7/2008 | Showalter |
| 2008/0182695 | A1 | 7/2008 | Showalter |
| 2008/0300080 | A1 | 12/2008 | Thompson |
| 2009/0038866 | A1 | 2/2009 | Abe et al. |
| 2009/0111641 | A1 | 4/2009 | Kim et al. |
| 2009/0112430 | A1 | 4/2009 | Showalter |
| 2009/0118051 | A1 | 5/2009 | Bock et al. |
| 2009/0197727 | A1 | 8/2009 | Janson |
| 2009/0253548 | A1 | 10/2009 | Showalter |
| 2009/0280948 | A1 | 11/2009 | Fuhrer et al. |
| 2010/0234162 | A1 | 9/2010 | Troennberg |
| 2010/0263950 | A1 | 10/2010 | Larsson et al. |

FOREIGN PATENT DOCUMENTS

| EP | 0 575 151 B1 | 1/1996 |
|---|---|---|
| EP | 1650109 A1 | 4/2006 |
| EP | 1 997 665 A1 | 12/2008 |
| EP | 2138372 | 12/2009 |
| FR | 2844858 A1 | 3/2004 |
| GB | 1317313 A | 5/1973 |
| GB | 2466968 | 7/2010 |
| JP | 02-038142 A | 2/1990 |
| JP | 10-100701 A | 4/1998 |
| JP | 2001039176 A | 2/2001 |
| JP | 2001039179 | 2/2001 |
| JP | 2003127680 A | 5/2003 |
| JP | 2004350462 A | 12/2004 |
| JP | 2005-042846 A | 2/2005 |
| JP | 2006046495 A | 2/2006 |
| WO | WO 03066363 A1 | 8/2003 |
| WO | WO-2004106101 | 12/2004 |
| WO | WO-2006010931 | 2/2006 |
| WO | WO-2006068607 | 6/2006 |
| WO | WO-2006108977 | 10/2006 |
| WO | WO-2009080474 A1 | 7/2009 |
| WO | WO-2009080475 A1 | 7/2009 |
| WO | WO-2009131531 | 10/2009 |
| WO | WO-2010066532 | 6/2010 |
| WO | WO-2010081691 A1 | 7/2010 |
| WO | WO-2010101506 | 9/2010 |
| WO | WO-2011076542 A1 | 6/2011 |
| WO | WO-2011089264 | 7/2011 |

OTHER PUBLICATIONS

Written Opinion for International Application No. PCT/IB2011/001637.

\* cited by examiner

AXLE ASSEMBLY WITH TORQUE DISTRIBUTION DRIVE MECHANISM

CROSS-REFERENCE TO RELATED APPLICATIONS

This application is a continuation of U.S. patent application Ser. No. 13/835,043 filed Mar. 15, 2013, which is a continuation-in-part of U.S. patent application Ser. No. 13/182,153 filed Jul. 13, 2011 entitled "Axle Assembly With Torque Distribution Drive Mechanism", which claims the benefit of U.S. Provisional Patent Application Ser. No. 61/364,072 filed Jul. 14, 2010 entitled "Torque Distribution Drive Mechanism" and U.S. Provisional Patent Application Ser. No. 61/468,809 filed Mar. 29, 2011 entitled "Torque Distribution Drive Mechanism". The disclosure of each of the above-identified patent applications is incorporated by reference as if fully set forth in detail herein.

FIELD

The present disclosure relates to an axle assembly and to a vehicle having a torque distribution drive mechanism.

BACKGROUND OF THE DISCLOSURE

One means for correcting or reducing understeer or oversteer slide in a vehicle is a torque-vectoring differential (TVD). TVD's are typically electronically-controlled differentials that are capable of creating a moment about the center of gravity of a vehicle independent of the speed of the vehicle wheels that would be employed to correct or reduce the understeer or oversteer slide.

U.S. Pat. No. 7,491,147 discloses an engine-driven TVD that employs a pair of speed control mechanisms that are disposed on opposite sides of a differential mechanism. Each speed control mechanism comprises a (spur) gear reduction and a friction clutch. The gear reduction transmits rotary power from a differential case of the differential mechanism to the friction clutch, and from the friction clutch to an associated (axle) output shaft.

Similarly, U.S. Pat. No. 7,238,140 discloses an engine-driven TVD that employs a pair of torque diverters that are disposed on opposite sides of a differential mechanism. Each torque diverter comprises a gear reduction and a magnetic particle brake. The gear reduction transmits rotary power from a differential case of the differential mechanism to an output member that is coupled to an associated axle output shaft for rotation therewith. The magnetic particle brake is configured to selectively brake the output member of the gear reduction.

U.S. Patent Application Publication No. 2010/0323837 discloses an electrically-driven TVD having a pair of planetary transmissions, an electric motor, and a sleeve that controls the operation of the planetary transmissions. The TVD can be operated in a first mode in which the TVD is configured as an open differential that is driven by the electric motor, and a second mode in which the TVD produces a torque vectoring output.

While such configurations can be effective for performing a torque vectoring function in which rotary power can be re-allocated across the differential mechanism from one axle shaft to the other, TVD's are nonetheless susceptible to improvement.

SUMMARY OF THE DISCLOSURE

This section provides a general summary of the disclosure, and is not a comprehensive disclosure of its full scope or all of its features.

In one form, the present teachings provide an axle assembly with an input member, a first planetary gear set, a differential assembly, and a second planetary gear set. The first planetary gear set has a first transmission input that is driven by the input member. The differential assembly has a differential carrier and first and second differential output members received in the differential carrier. The second planetary gear set has a planet carrier coupled to the differential carrier for common rotation. A sun gear of the first planetary gear set is non-rotatably coupled to a sun gear of the second planetary gear set.

In another form, the present teachings provide an axle assembly with an input member, a first planetary gear set, a differential assembly and a second planetary gear set. The first planetary gear set has a first transmission input, a first sun gear, a first ring gear, a plurality of first planet gears, and a first planet carrier. The first transmission input is driven by the input member. The first planet gears are meshingly engaged to the first sun gear and the first ring gear. The first planet carrier supports the first planet gears for rotation. The differential assembly has a differential carrier and first and second output members that are received in the differential carrier. The second planetary gear set has a second planet carrier coupled to the differential carrier for common rotation. The input member, the first planetary gear set and the second planetary gear set are disposed on a common axial end of the differential carrier. The axle assembly is operable in a mode in which the first and second planet carriers are rotatably decoupled from one another.

The first planetary gear set has a first transmission input that is driven by the input member. The differential assembly has a differential carrier and first and second output members received in the differential carrier. The second planetary gear set has a planet carrier coupled to the differential carrier for common rotation. The input member, the first planetary gear set and the second planetary gear set are disposed on a common axial end of the differential carrier.

In another form, the present teachings provide an axle assembly that includes a motor, an input member driven by the motor, a differential assembly, a transmission and a shiftable element. The differential assembly has a differential carrier and first and second differential outputs received in the differential case. The transmission receives rotary power from the input member. The shiftable element is axially movable between a first position and a second position. Positioning of the shiftable element in the first position couples the transmission to the differential assembly to establish a torque vectoring mode in which the transmission applies an equal but oppositely directed torque to the first and second differential outputs. Positioning of the shiftable element in the second position couples the transmission to the differential assembly to directly drive the differential carrier.

In still another form, the present teachings provide an actuator for linear displacement of a part in a mechanism that is switchable between at least two modes. The actuator includes an input member arranged to be operably coupled to a drive member, an output member arranged to be operably coupled to the switch, and a converting member for converting a rotational movement of the drive member into a linear movement of the switch. The converting member includes a cylindrical cam having a cam groove extending along at least a part of a periphery of the cam, and a cam follower arranged to move in the cam groove. The cam is operably coupled to the input member, and the cam follower is operably coupled to the output member. The groove includes a first groove portion extending parallel to a transverse plane that is perpendicular to a longitudinal axis of the cam, a second groove portion extending parallel to the transverse plane, and a third groove portion extending between the first and second groove portion, and extending in a direction along the periphery of the cam forming an angle of more than 0° in relation to the transverse plane.

In a further form, the present disclosure provides an axle assembly with a motor, a differential assembly, a housing, a transmission and a reduction gearset. The motor has an output shaft disposed along an output shaft axis. The differential assembly has a differential carrier and first and second differential outputs that are received in the differential carrier which are rotatable about an output axis. The transmission is received in the housing and has first and second planetary gearsets. The first planetary gearset has a first ring gear, a first planet carrier and a first sun gear. The first planet carrier is coupled to the differential carrier for common rotation. The second planetary gearset has a second ring gear, a second planet carrier and a second sun gear. The second ring gear is non-rotatably coupled to the housing. The second planet carrier is coupled to the second differential output for common rotation. The second sun gear is coupled to the first sun gear for common rotation. The reduction gearset is disposed between the output shaft and the first ring gear and includes a first gear, which is coupled to the output shaft for rotation therewith, and a second gear that is coupled to the first ring gear for rotation therewith.

In yet another form, the present teachings provide an axle assembly having first and second axle shafts, a differential assembly, a housing and a transmission. The differential assembly has a differential carrier and first and second differential outputs received in the differential carrier that are rotatable about an output axis. The first differential output is drivingly coupled to the first axle shaft. The second differential output is drivingly coupled to the second axle shaft. The transmission is received in the housing and has first and second planetary gearsets. The first planetary gearset has a first ring gear, a first planet carrier and a first sun gear. The first planet carrier is coupled to the differential carrier for common rotation. The second planetary gearset has a second ring gear, a second planet carrier and a second sun gear. The second ring gear is non-rotatably coupled to the housing. The second planet carrier is coupled to the second differential output and the second axle shaft for common rotation. The second sun gear is coupled to the first sun gear for common rotation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
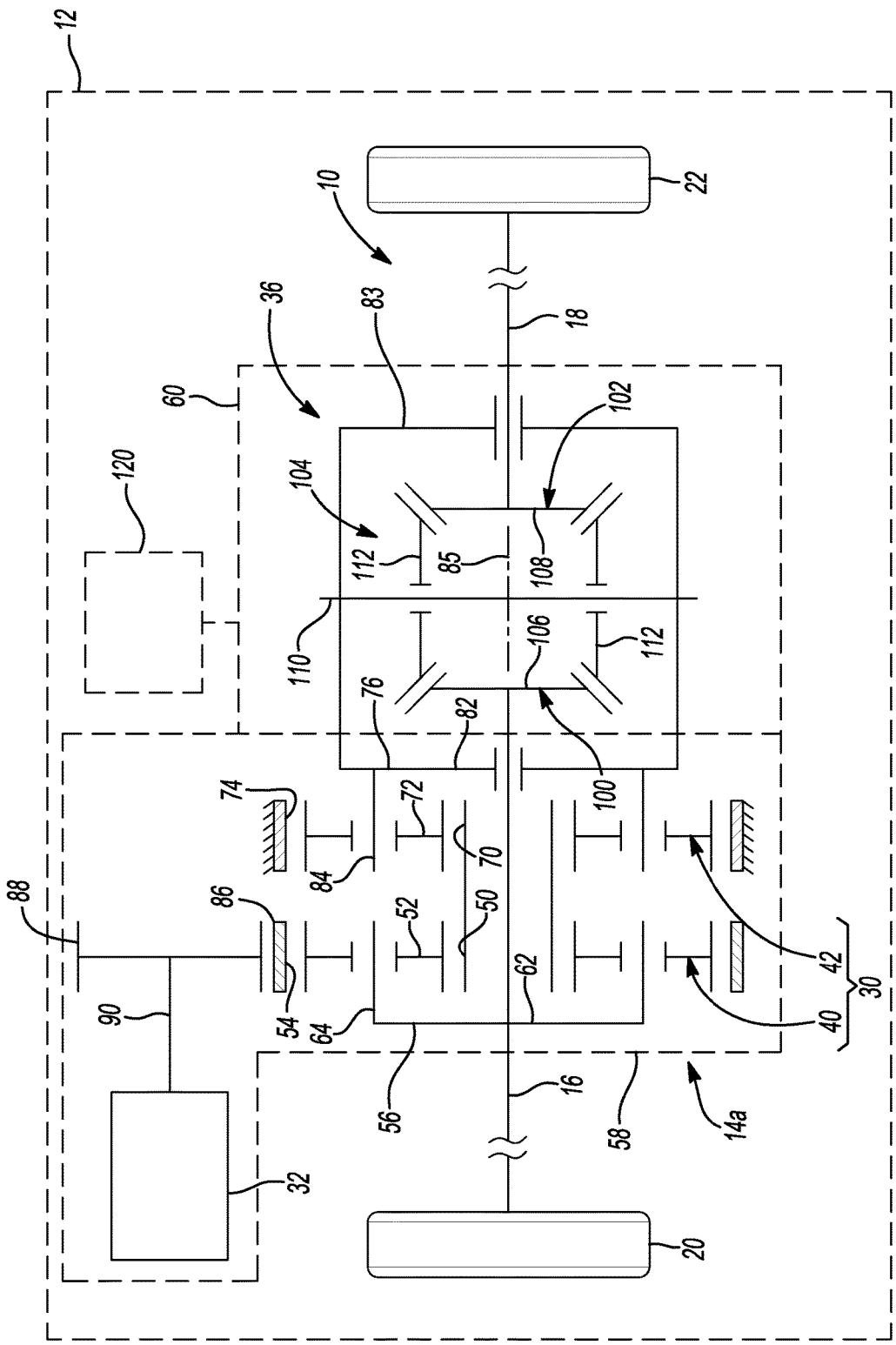
FIG. 1 diagrammatically illustrates a cross-sectional view of a torque distribution drive mechanism according to a first embodiment.

With reference to FIG. 1, an axle assembly constructed in accordance with the teachings of the present disclosure is generally indicated by reference numeral 10. The axle assembly 10, which could be a front axle assembly or a rear axle assembly of a vehicle 12 for example. The axle assembly 10 can include a torque distribution drive mechanism 14a that may be used for transmitting torque to a first output member 16 and a second output member 18, which are illustrated as being first and second axle shafts, respectively, in the present example. For example, the first output member 16 may be coupled to a left wheel 20 and the second output member 18 may be coupled to a right wheel 22 of the axle assembly 10. In particular and as further explained below, the torque distribution drive mechanism 14a may be used for torque vectoring, that is, to generate a torque difference between the first and second output members 16 and 18.

The torque distribution drive mechanism 14a can comprise a dual planetary gear set 30 and a drive member 32.

The dual planetary gear set 30 can be co-axially mounted with respect to the first and second output members 16 and 18 and/or a differential assembly 36. The dual planetary gear set 30 can comprise a first planetary gear set 40 and a second planetary gear set 42. The first and second planetary gear sets 40 and 42 can have identical gear ratios and can be configured such that one or more of the components of the first planetary gear set 40 is/are interchangeable with associated component(s) of the second planetary gear set 42.

The first planetary gear set 40 can comprise a first sun gear 50, a plurality of first planet gears 52, a first ring gear 54, and a first planet carrier 56. The first sun gear 50 can be a generally hollow structure that can be mounted concentrically about the first output member 16. The first planet gears 52 can be spaced circumferentially about the first sun gear 50 such that teeth of the first planet gears 52 meshingly engage teeth of the first sun gear 50. Likewise, the first ring gear 54 can be disposed concentrically about the first planet gears 52 such that the teeth of the first planet gears 52 meshingly engage teeth on the first ring gear 54. The first ring gear 54 can be rotatably disposed in a transmission housing 58 that can be non-rotatably coupled to a differential housing 60 that houses the differential assembly 36. The first planet carrier 56 can include a first carrier body 62 and a plurality of first pins 64 that can be fixedly coupled to the first carrier body 62. The first carrier body 62 can be coupled to the first output member 16 such that the first carrier body 62 and the first output member 16 co-rotate. Any suitable means may be employed to couple the first carrier body 62 to the first output member 16, including welds and mating teeth or splines. Each of the first pins 64 can be received into an associated one of the first planet gears 52 and can support the associated one of the first planet gears 52 for rotation about a longitudinal axis of the first pin 64.

The second planetary gear set 42 can comprise a second sun gear 70, a plurality of second planet gears 72, a second ring gear 74, and a second planet carrier 76. The second sun gear 70 can be a generally hollow structure that can be mounted concentrically about the first output member 16. The second sun gear 70 can be non-rotatably coupled to the first sun gear 50 (e.g., the first and second sun gears 50 and 70 can be integrally and unitarily formed). The second planet gears 72 can be spaced circumferentially about the second sun gear 70 such that the teeth on the second planet gears meshingly engage teeth of the second sun gear 70. The second ring gear 74 can be disposed concentrically about the second planet gears 72 such that the teeth of the second planet gears 72 meshingly engage teeth on the second ring gear 74. The second ring gear 74 can be non-rotatably coupled to the transmission housing 58. The second planet carrier 76 can include a second carrier body 82 and a plurality of second pins 84 that can be fixedly coupled to the second carrier body 82. The second carrier body 82 can be coupled to a housing or differential carrier 83 of the differential assembly 36 such that the second carrier body 82 and the differential carrier 83 co-rotate. Each of the second pins 84 can be received into an associated one of the second planet gears 72 and can support the associated one of the second planet gears 72 for rotation about a longitudinal axis of the second pin 84.

The first and second planetary gear sets 40 and 42 can be co-aligned about a common longitudinal axis (i.e., an axis that can extend through the first and second sun gears 50 and 70) and can be offset from one another axially along the common longitudinal axis 85.

The drive member 32 can be any means for providing a rotary input to the dual planetary gear set 30, such as an electric or hydraulic motor, and can be employed to drive an input member 86 that transmits rotary power to a transmission input of the first planetary gear set 40. In the example provided, the transmission input is integral with the first ring gear 54, and the input member 86 is coupled to the first ring gear 54 for common rotation and includes a plurality of teeth that meshingly engage teeth of a reduction gear 88 that is mounted on an output shaft 90 of the drive member 32. The input member 86 can be a discrete component that can be non-rotatably coupled to the first ring gear 54, but in the example provided, the input member 86 and the first ring gear 54 are unitarily formed as a single discrete component.

In addition to the differential housing 60 and the differential carrier 83, the differential assembly 36 can include a means for transmitting rotary power from the differential carrier 83 to the first and second output members 16 and 18. The rotary power transmitting means can include a first differential output 100 and a second differential output 102. In the particular example provided, the rotary power transmitting means comprises a differential gear set 104 that is housed in the differential carrier 83 and which has a first side gear 106, a second side gear 108, a cross-pin 110 and a plurality of pinion gears 112. The first and second side gears 106 and 108 can be rotatably disposed about a rotational axis of the differential carrier 83 and can comprise the first and second differential outputs 100 and 102, respectively. The first output member 16 can be coupled to the first side gear 106 for common rotation, while the second output member 18 can be coupled to the second side gear 108 for common rotation. The cross-pin 110 can be mounted to the differential carrier 83 generally perpendicular to the rotational axis of the differential carrier 83. The pinion gears 112 can be rotatably mounted on the cross-pin 110 and meshingly engaged with the first and second side gears 106 and 108.

While the differential assembly 36 has been illustrated as employing bevel pinions and side gears, it will be appreciated that other types of differential mechanisms could be employed, including differential mechanisms that employ helical pinion and side gears or planetary gear sets.

Optionally, the differential assembly 36 may be coupled to a main or primary drive of the vehicle 12. In the particular example provided, the primary drive of the vehicle comprises an engine 120 that is employed to drive the differential assembly 36. In this regard, rotary power produced by the engine 120 can be transmitted in a conventional manner to the differential carrier 83 to drive the first and second output members 16 and 18 (i.e., via the differential carrier 83 and the differential gear set 104). In this way, the drive member 32 may serve as a complement to the primary drive of the vehicle 12 such that when an auxiliary torque is simultaneously generated by the drive member 32, the auxiliary torque will be superimposed to the first and second output torques induced by the primary drive as further explained in the following.

When the drive member 32 is activated (i.e., when the output shaft 90 of the drive member 32 rotates in the example provided), the drive member 32, the reduction gear 88 and the input member 86 can cooperate to apply rotary power to the first ring gear 54 of the first planetary gear set 40. The rotary power received by the first ring gear 54 is transmitted via the first planet gears 52 and the first planet carrier 56 to the first output member 16, while an opposite reaction is applied to the first sun gear 50 such that the first sun gear 50 rotates in a direction that is opposite to the first planet carrier 56. Rotation of the first sun gear 50 causes corresponding rotation of the second sun gear 70 to thereby drive the second planet gears 72. Because the second ring gear 74 is rotationally fixed to the transmission housing 58, rotation of the second planet gears 72 causes rotation of the second planet carrier 76 in a direction that is opposite to the direction of rotation of the first planet carrier 56. Accordingly, the magnitude of the rotary power (i.e., torque) that is transmitted from the second planet carrier 76 to the differential carrier 83 (and through the differential assembly 36 to the second output member 18) is equal but opposite to the magnitude of the rotary power (i.e., torque) that is transmitted from the first planet carrier 56 to the first output member 16.

Thus, as a result, the torque induced by the drive member 32 to the first and second output members 16 and 18, respectively, is counter-directed. Moreover, since the first and second planetary gear sets 40 and 42 are operably coupled via the differential assembly 36, the magnitude of the induced torque at the first and second output members 16 and 18 is substantially equal. For example, if a positively directed torque is transmitted to the first output member 16 (via rotation of the output shaft 90 of the drive member 32 in a first rotational direction), an equal negative torque is transmitted to the second output member 18. Similarly, if a negatively directed torque is transmitted to the first output member 16 (via rotation of the output shaft 90 of the drive member 32 in a second rotational direction opposite the first rotational direction), an equal positive torque is transmitted to the second output member 18. In other words, the torque distribution drive mechanism 14a may be employed to generate a torque difference between the first and second differential outputs 100 and 102, which is communicated to the left and the right wheels 20 and 22, respectively, through the first and second output members 16 and 18, respectively.

In situations where the drive member 32 is activated when rotary power is transmitted from the primary drive (i.e., engine 120 in the example illustrated) to the differential assembly 36, the torque transmitted by the torque distribution drive mechanism 14a will act as an offset torque which is superposed to the input torque transmitted to the axle assembly 10 from the primary drive. Stated another way, the input torque from the primary drive is distributed via the differential assembly 36 such that a first drive torque is applied via the first differential output 100 to the first output member 16 and a second drive torque is applied via the second differential output 102 to the second output member 18, while a supplemental torque induced by the drive member 32 is distributed via the dual planetary gear set 30 such that a first vectoring torque is applied to the first output member 16 and a second vectoring torque (which is equal and opposite to the first vectoring torque in the example provided) is applied to the second output member 18 (via the differential assembly 36). The net torque acting on the first output member 16 is the sum of the first drive torque and the first vectoring torque, while the net torque acting on the second output member 18 is the sum of the second drive torque and the second vectoring torque.

As an example, the torque distribution drive mechanism 14a may subtract a torque from the left wheel 20 and add a corresponding torque to the right wheel 22 when the motorized vehicle 12 turns left, and may subtract a torque from the right wheel 22 and add a corresponding torque to the left wheel 20 when the motorized vehicle 12 turns right to improve the turning behavior of the vehicle 12 and decrease its turning radius.

Those of skill in the art will appreciate that the configuration of the dual planetary gear set 30 causes the first and second sun gears 50 and 70 to experience the highest rotational velocity, while the first ring gear 54 rotates at a somewhat slower rotational velocity, and the first and second planet carriers 56 and 76 rotate at a rotational velocity that is slower than that of the first ring gear 54. In this way a favorable gear ratio, such as a gear ratio of about 1:1.5 to about 1:2.0, can be achieved between the first ring gear 54 and the first output member 16. As a result, the size of the gears of the dual planetary gear set 30 may be made small. For example, the diameter of the first and second planet gears 52 and 72 may be as small as about 30 mm. In this way, the size of the dual planetary gear set 30 may be small, and thereby the torque distribution drive mechanism 14a may be made compact and lightweight.

The drive member 32 is intended to be activated (e.g., automatically or on an as-needed basis) when the vehicle 12 turns. During straight forward driving, the drive member 32 is therefore non-activated to permit the vehicle 12 to be propelled in a forward direction by the engine 120. In such a situation, the differential assembly 36, which receives the input torque from the engine 120, transmits a substantially equal torque to the first output member 16 and the second output member 18. In turn, a substantially equal torque is transmitted to the first and second planetary carriers 56 and 76 which rotate with a substantially equal speed. As an effect, and due to the identical planetary gear sets 40 and 42, there will be no relative motion between the first and second ring gears 54 and 74, meaning that almost no effect or torque is transferred to the first and second ring gears 54 and 74. In other words, neither the first ring gear 54 nor the second ring gear 74 will rotate. In this way, the output shaft 90 of the drive member 32 will not move and losses during straight forward driving are in this way minimized.

While the input member 86 has been illustrated and described as directly engaging the reduction gear 88, it will be appreciated that one or more reduction stages could be disposed between the input member 86 and the reduction gear 88 or that the input member 86 could be directly driven by the drive member 32.

Figure 2:
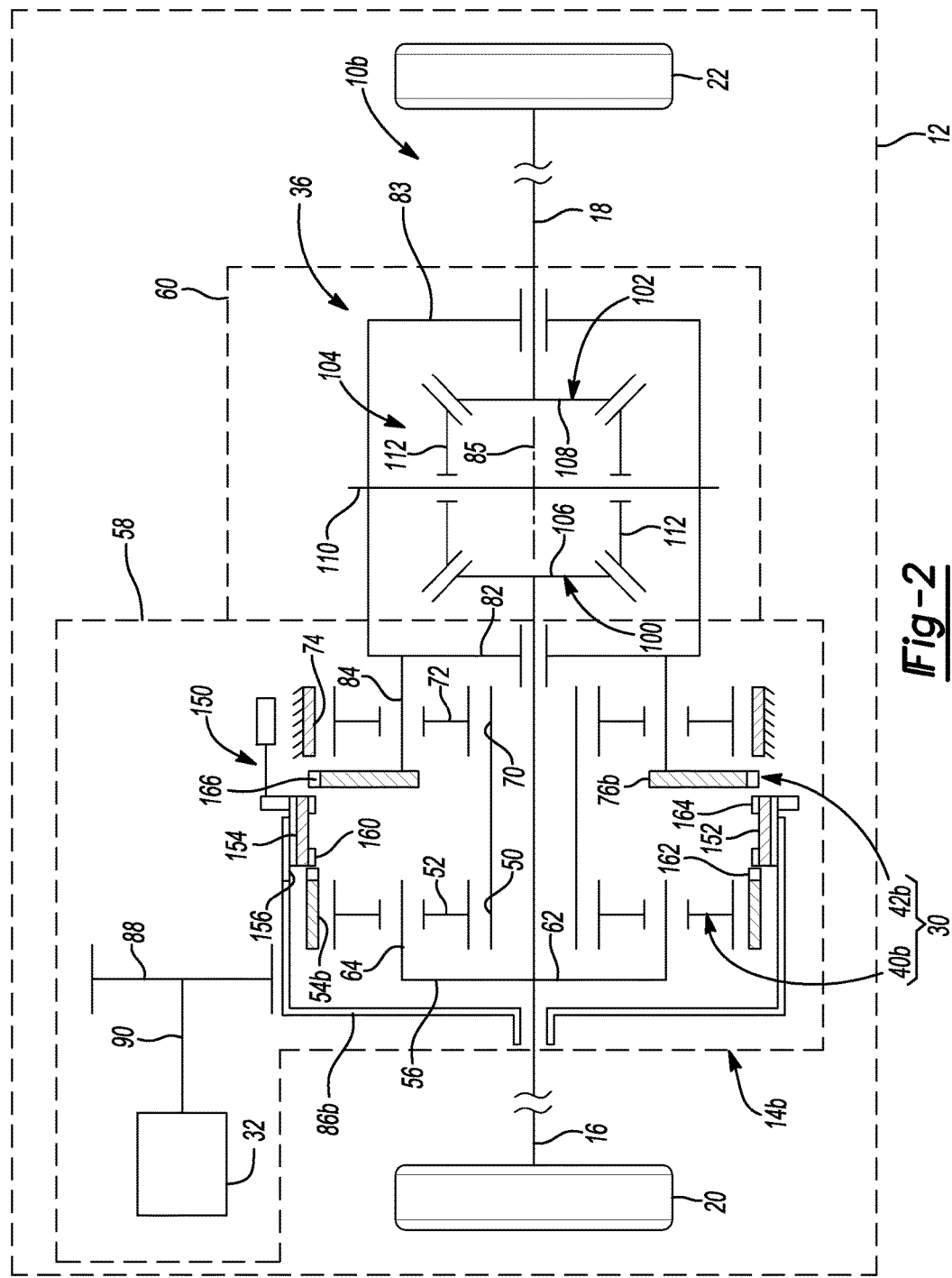
FIG. 2 diagrammatically illustrates a cross-sectional view of a torque distribution drive mechanism operable in several modes according to a second embodiment.

With reference to FIG. 2, another axle assembly constructed in accordance with the teachings of the present disclosure is generally indicated by reference numeral 10b. The axle assembly 10b can be generally similar to the axle assembly 10 of FIG. 1 except as noted herein. In this example, the axle assembly 10b comprises a torque distribution drive mechanism 14b that is selectively operable in a plurality of operational modes including a torque vectoring mode, a drive mode and a neutral mode. The torque distribution drive mechanism 14b can be structurally similar to the torque distribution drive mechanism 14a of FIG. 1, except that the input member 86b is rotatable relative to the first ring gear 54b and an actuator 150 is employed to control the operational state of the torque distribution drive mechanism 14b. The input member 86b can comprise a crown gear that can be rotatably mounted about the first output member 16 and the first planetary gear set 40b. The actuator 150 can include a shift sleeve 152 that can form the transmission input. The shift sleeve 152 can have a toothed exterior surface 154, which can be non-rotatably but axially slidably engaged to a matingly toothed interior surface 156 of the input member 86b, a set of first internal teeth 160, which can be matingly engaged to corresponding teeth 162 formed on the first ring gear 54b, and a set of second internal teeth 164 that can be matingly engaged to corresponding teeth 166 formed on the second planet carrier 76b.

In the torque vectoring mode, the shift sleeve 152 can be positioned in a first position to couple the input member 86b to the first ring gear 54b (via engagement of the set of first internal teeth 160 to the teeth 162 on the first ring gear 54b) such that the input member 86b, the shift sleeve 152 and the first ring gear 54b co-rotate. It will be appreciated that the set of second internal teeth 164 are disengaged from the teeth 166 on the second planet carrier 76b when the shift sleeve 152 is in the first position. Accordingly, it will be appreciated that operation of the torque distribution drive mechanism 14b in the torque vectoring mode is substantially similar to the operation of the torque distribution drive mechanism 14a (FIG. 1). In this regard, the drive member 32 may be selectively activated to induce a torque difference between the first and second output members 16 and 18 as previously explained.

In the drive mode, the shift sleeve 152 can be positioned in a second position to couple the input member 86b to the second planet carrier 76b (via engagement of the set of second internal teeth 164 with the teeth 166 on the second planet carrier 76b) such that rotary power provided by the drive member 32 is input to differential carrier 83 and applied to the first and second output members 16 and 18 via the differential assembly 36. It will be appreciated that the set of first internal teeth 160 on the shift sleeve 152 can be disengaged from the teeth 162 on the first ring gear 54b when the shift sleeve 152 is in the second position. It will also be appreciated that rotary power provided by the drive member 32 when the torque distribution drive mechanism 14b is operated in the drive mode is employed for propulsive power to propel (or aid in propelling) the vehicle 12.

In the neutral mode, the shift sleeve 152 can uncouple the input member 86b from the first ring gear 54b and the second planet carrier 76b such that the input member 86b is decoupled from the first planetary gear set 40b, the second planetary gear set 42b, and the differential carrier 83. In the example provided, the shift sleeve 152 can be positioned in a third position between the first and second positions such that the sets of first and second internal teeth 160 and 164 are disposed axially between and disengaged from the teeth 162 on the first ring gear 54b and the teeth 166 on the second planet carrier 76b. Accordingly, placement of the shift sleeve 152 in the third position decouples the drive member 32 from the first planetary gear set 40b, the second planetary gear set 42b and the differential carrier 83.

Figure 3:
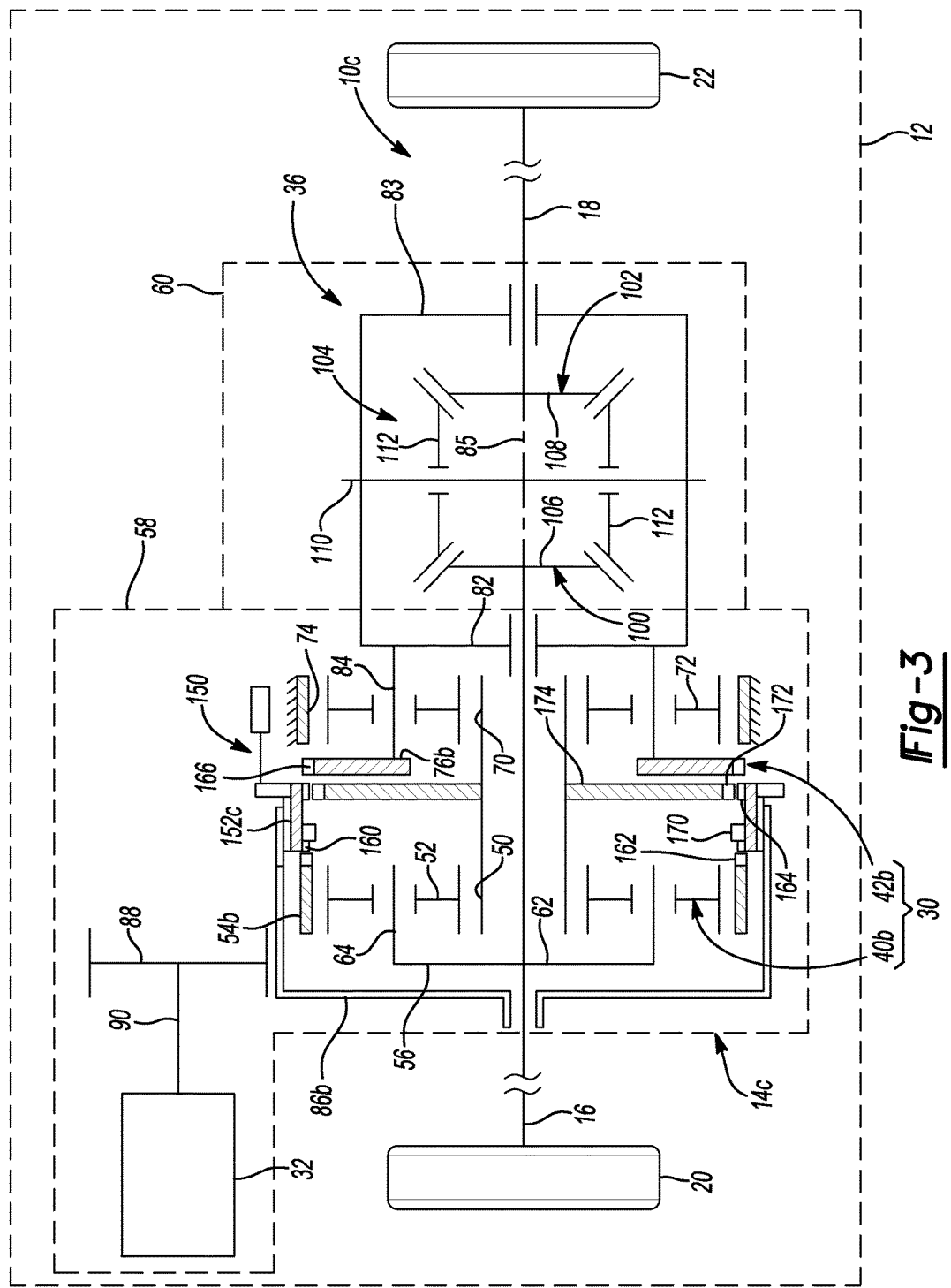
FIG. 3 diagrammatically illustrates a cross-sectional view of a torque distribution drive mechanism operable in several modes according to a third embodiment.

With reference to FIG. 3, yet another axle assembly constructed in accordance with the teachings of the present disclosure is generally indicated by reference numeral 10c. The axle assembly 10c can be generally similar to the axle assembly 10b of FIG. 2 except as noted herein. In this example, the axle assembly 10c comprises a torque distribution drive mechanism 14c that is selectively operable in a plurality of operational modes including a torque vectoring mode, a drive mode, a neutral mode and a low speed drive mode. The torque distribution drive mechanism 14c can be structurally similar to the torque distribution drive mechanism 14b of FIG. 2, except that the shift sleeve 152c can have a third set of internal teeth 170 that can be selectively engaged to teeth 172 of a toothed element 174 that is coupled to the first and second sun gears 50 and 70 for rotation therewith. The set of third internal teeth 170 are not engaged to any other structure when the torque distribution drive mechanism 14c is operated in the torque vectoring, drive, and neutral modes and as such, the operation of the torque distribution drive mechanism 14c is substantially similar to the operation of torque distribution drive mechanism of FIG. 2 in these modes.

In the low speed drive mode, however, the shift sleeve 152c can be positioned in a fourth position to couple the input member 86b to the first and second sun gears 50 and 70 (via the engagement of the set of third internal teeth 170 to the teeth 172 on the element 174) such that the input member 86b, the shift sleeve 152c, the element 174, and the first and second sun gears 50 and 70 co-rotate. In this mode, the second planetary gear set 42b is employed as a gear reduction which causes the second planet carrier 76b to rotate at a rotational speed that is lower than the rotational speed of the second sun gear 70. It will be appreciated that the sets of first and second internal teeth 160 and 164 are disengaged from the teeth 162 on the first ring gear 54b and the teeth 166 on the second planet carrier 76b when the shift sleeve 152c is in the fourth position.

Those of skill in the art will appreciate that rotary power is input to the dual planetary gear set 30b at different locations when torque distribution drive mechanism 14c is operated in the drive mode and in the low speed drive. In this regard, rotary power is input to the second planet carrier 76b in the drive mode, and input to the first and second sun gears 50 and 70 in the low speed drive. Accordingly, it will be appreciated that the differential carrier 83 will rotate at a slower rotational velocity (for a given rotational speed of the output shaft 90 of the drive member 32) in the low speed drive as compared to the drive mode. In this regard, rotation of the first and second sun gears 50 and 70 when the torque distribution drive mechanism 14c is operated in the low speed drive will cause corresponding rotation of the second planet gears 72, which in turn drives the rotation of the second planet carrier 76 and the differential carrier 83. Stated another way, a gear reduction is disposed between the rotary input (i.e., the element 174) and the differential carrier 83 when the torque distribution drive mechanism 14c is operated in the low speed drive, and no gear reduction is disposed between the rotary input (i.e., the second planet carrier 76b) and the differential carrier 83 when the torque distribution drive mechanism 14c is operated in the drive mode.

The dimension of the shift sleeve 152 in the axial direction and the width and spacing of the several sets of teeth can be selected such that at most one of the sets of internal teeth 160, 164 and 170 is permitted to engage the corresponding teeth 162, 166 and 172, respectively, at the same time. Additionally or alternatively, the pitch diameters of the mating sets of teeth can be sized differentially to permit certain teeth to slide over other teeth where engagement of those teeth are not desired. For example, the pitch diameter of the set of second internal teeth 164 is larger than the pitch diameter of the set of third internal teeth 170 so that the set of second internal teeth 164 may pass axially across the teeth 172 on the element 174 that is rotatably coupled to the first and second sun gears 50 and 70.

It is also possible to construct a torque distribution drive mechanism which is operable in the drive and neutral modes only. In such a case, the dual planetary gear set 30 may be omitted since its functionalities of generating counter-directed torques in the torque vectoring mode and reduced speed input to the differential carrier 83 in the low speed drive are not needed.

In such a situation, the torque distribution drive mechanism may comprise a drive member, a crown gear operably coupled to the drive member, a switching member rotationally coupled to the crown gear for switching between the drive mode and the neutral gear mode, and a differential being operably coupled to a first and a second output member. The shift sleeve 152 or other switching member may be arranged to engage with the differential. In particular, the switching member may be arranged to engage with a differential carrier of the differential. Further, the switching member may be arranged to be in a position where it is uncoupled from the differential.

Similar to the embodiments of FIGS. 2 and 3, disclosed above, the switching element may comprise a shift sleeve rotationally coupled to the crown gear. Further, the switching element may comprise a radially extending teeth structure which is arranged on the shift sleeve in an inwards radial direction and which is arranged to engage with a mating teeth structure on the outer surface of the differential carrier. The shift sleeve may slide along the crown gear in an axial direction. By sliding the shift sleeve towards the differential, the teeth structure of the shift sleeve may engage with the mating teeth structure on the differential carrier. In this way, the torque distribution drive mechanism is operable in the high gear mode. When sliding the shift sleeve away from the differential, the teeth structure of the switching member disengages from the teeth structure on the outer surface of the differential carrier. In this way, the drive member will be in a neutral gear since it does not induce any torque to the differential.

An advantage with this construction is that it may be formed in a modular way. That is, the construction may be formed as a module which easily may be added to a differential in an existing transmission.

The switching element or shift sleeve in each of the last three examples can be moved axially by any desired actuator, including conventional shift fork actuators of the type that are commonly used in transfer cases. It will be appreciated, too, that one or more synchronizers can be incorporated with the shift sleeve to permit the shift sleeve to be driven (e.g., via the first ring gear or the second planetary carrier) prior to actuation of the drive member 32 such that the rotational speed of the shift sleeve matches the rotational speed of the component to which the shift sleeve is to be rotationally coupled.

Figure 4:
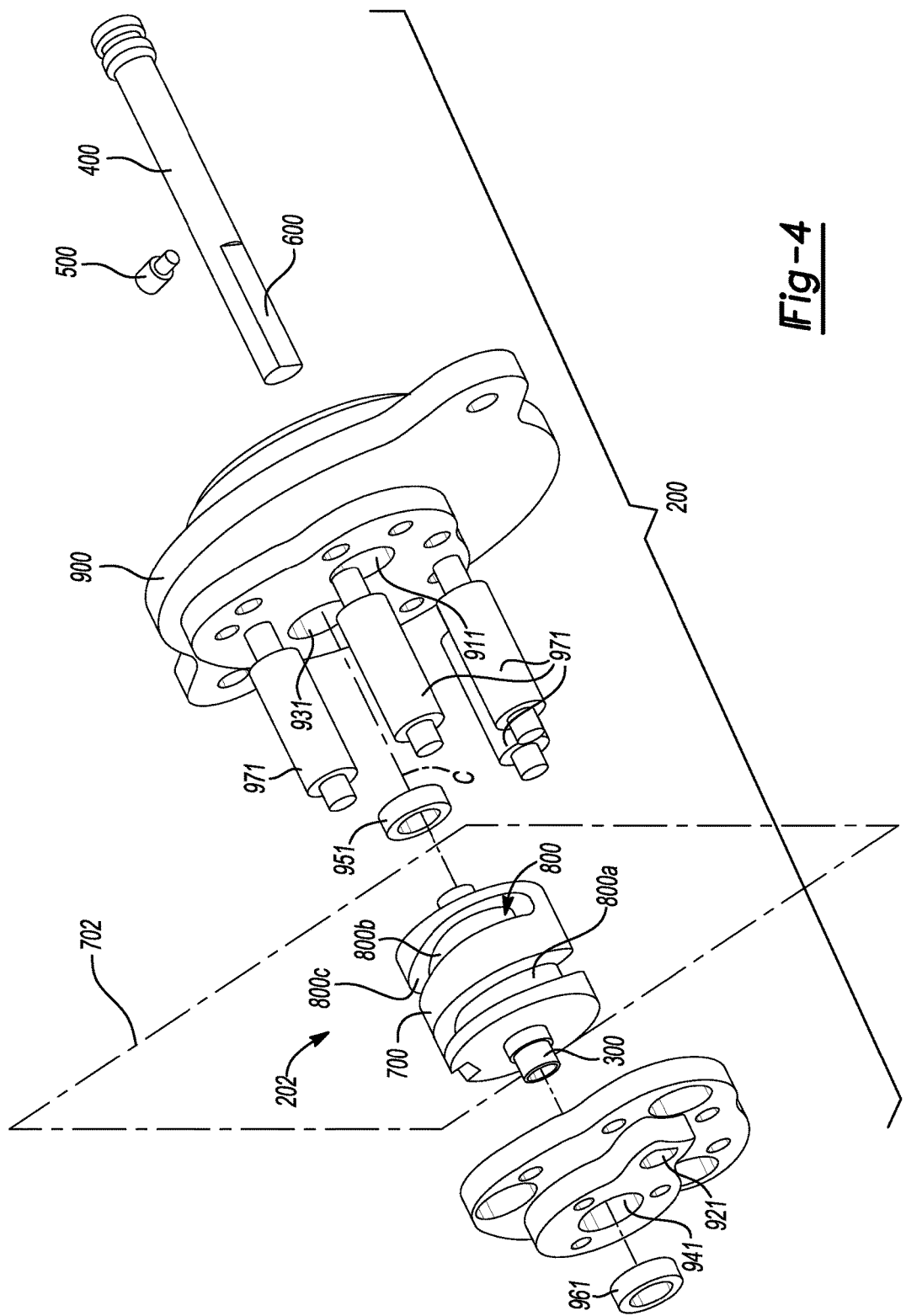
FIG. 4 is a disassembled view of an actuator according to an embodiment of the disclosure.
Figure 6:
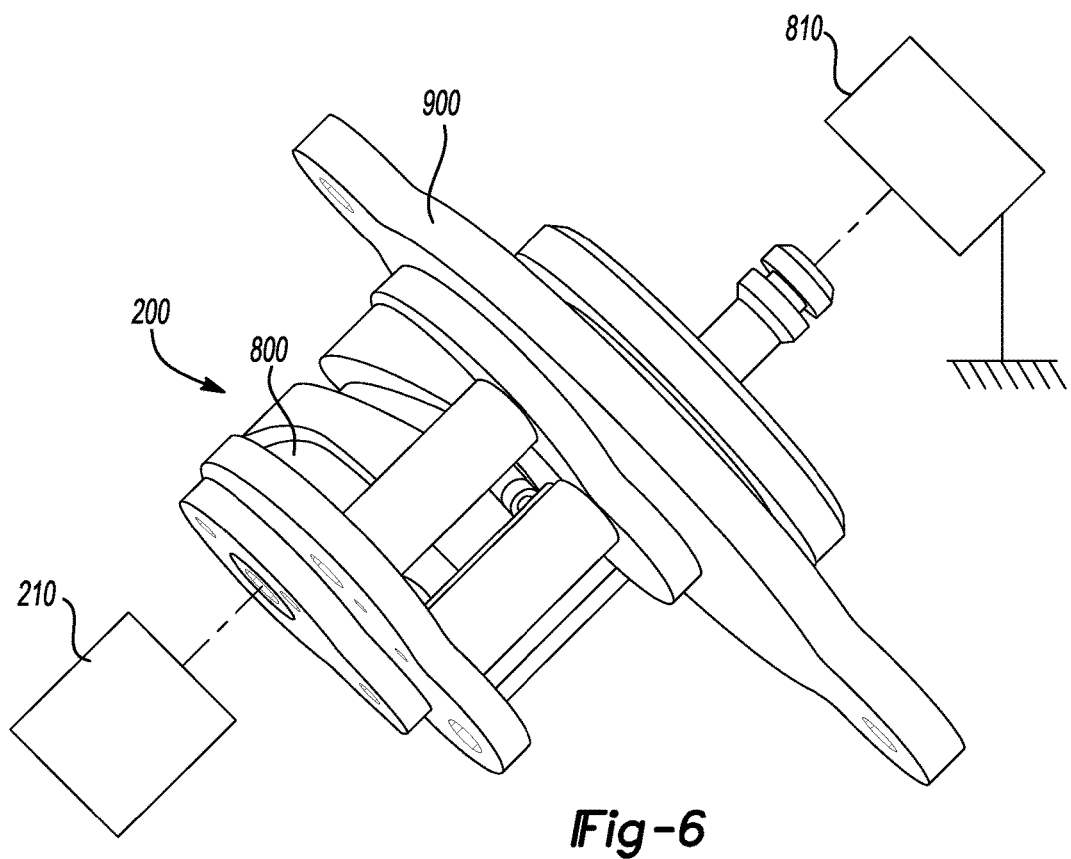
FIG. 6 is a perspective view of the actuator of FIG. 6.

With reference to FIG. 4, an exemplary actuator 200 for translating a shift sleeve is illustrated. The actuator 200 has an input member in the form of a rotational connection 202 to a drive member, such as an electric DC motor 210, FIG. 6, or other suitable rotational input device. The rotational connection 202 generally comprises a rotational shaft 300, which is connected to the motor 210. Further, the actuator 200 has an output member 400 in the form of a piston or rod. Attached to the rod 400 is a projection or nub 500. Along a guide portion 600 of the rod 400, a cross-section of the rod 400 is non-cylindrical.

A cylindrical cam 700 is arranged on the rotational shaft 300. Around the cylindrical cam 700 a cam groove 800 is formed. The cam groove 800 is divided into three groove portions 800a, 800b, and 800c. A first groove portion 800a extends along and about the periphery of the cam 700 in a direction parallel to a transverse plane 710 that is perpendicular to a longitudinal axis C of the cam 700. A second groove portion 800b also extends along and about the periphery of the cam 700 in the direction parallel to the transverse plane 710. A third groove portion 800c extends along and about the periphery of the cam 700 between the first groove portion 800a and the second groove portion 800b, and extends in a direction forming an angle of more than 0° in relation to the transverse plane. Thus, the first and second groove portions 800a and 800b are not inclined, i.e. they each have zero slope in the axial direction of the cam 700 and relative to the transverse plane 702, whereas the third groove portion 800c slopes and extends axially along longitudinal axis C of the cam 700.

A first flange 900 and a second flange 901 are arranged one on each side of the cylindrical cam 700. A first through-hole 911 in the first flange 900 and a second through-hole 921 in the second flange 901 form a guide for the rod 400. The second through-hole 921 forms a passage with a non-circular cross-section matching the cross section of the guide portion 600 of the rod 400. A third through-hole 931 of the first flange 900 and a fourth through-hole 941 of the second flange 901 are arranged to each receive a respective end of the rotational shaft 300, supported for rotation by respective journal bearings 951 and 961. Four distancing or spacer elements 971 are arranged to be placed between the flanges 900 and 901.

Figure 5:
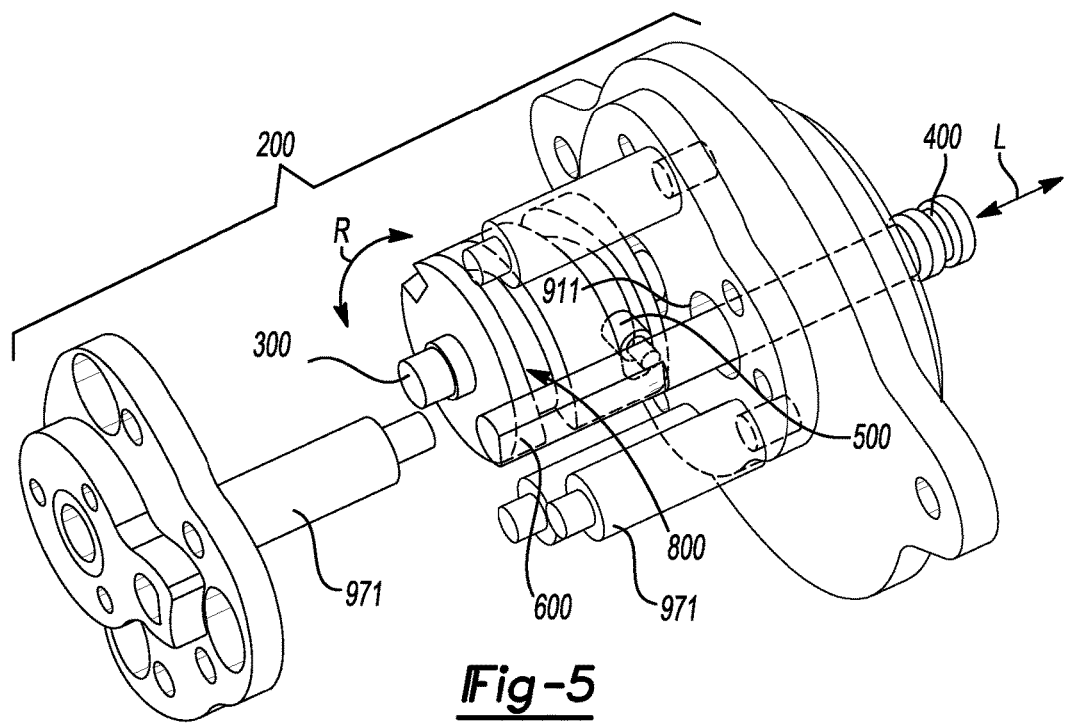
FIG. 5 is a partially disassembled view of the actuator of FIG. 4.

FIG. 5 illustrates how the parts of the actuator 200 are assembled. In particular, it may be seen that the nub 500 is fitted inside the cam groove 800. As the cylindrical cam 700 is rotated by the motor 210, the nub 500 is forced to follow the groove 800. When the nub 500 moves axially from the first groove 800a through the third groove portion 800c and to the second groove portion 800b, the rod is displaced in a linear direction L. Thus, a movement of the cylindrical cam 700 in a rotational direction R is converted into a linear displacement in the linear direction L.

When the nub 500 is positioned in the first groove portion 800a, which has zero slope, an angle between the groove and the rod is 90°. As such, the nub 500 will have no axial or linear forced applied thereto and the rod 400 will be kept still in this position. The first groove portion 800a corresponds to a first position of a switch 810 operably coupled to the rod 400. In this first position, the switch 810 ensures that the shift sleeve 152 (FIG. 2) can be positioned in the third position to permit the torque distribution drive mechanism 14b (FIG. 2) to operate in the drive mode.

If the motor 210 is started, the cylindrical cam 700 rotates in the rotational direction R and the nub 500 is moved from the first groove portion 800a, along the sloping third groove portion 800c, to the second groove portion 800b, thereby moving the rod 400 in the linear direction L. Since the second groove portion 800b has zero slope, the nub 500 will have no axial or linear force applied thereto and the rod 400 will be kept still in this position once the motor 210 is stopped. Thereby, the rod 400 will stop moving and the switch 810 will be held in a second position. In this second position, the switch ensures that the shift sleeve 152 (FIG. 2) can be positioned in the first position to permit the torque distribution drive mechanism 14b (FIG. 2) to operate in the torque vectoring mode.

The person of ordinary skill in the art will appreciate that a number of modifications of the embodiments described herein are possible without departing from the scope of the disclosure, which is defined in the appended claims For instance, the actuator 200 has above been described in the context of a torque distribution mechanism of a motorized vehicle 12, but such an actuator is equally useful in other constructions. The actuator could, e.g., be used in a lock mechanism, wherein the different modes could correspond to a locked state and an unlocked state. Generally, an actuator of the type described above may be used in any context in which a part is to be linearly displaced quickly and with precision, and in which the displacement is to be driven by a drive member giving a rotational output.

In the exemplary embodiment described above, the groove 800 has two groove portions 800a and 800c with no inclination. Naturally, more than two non-inclined groove portions may be formed on the cam 700, each non-inclined groove portion corresponding to a position of the part that is connected to the rod, e.g., a switch. Thus, in a torque distributing drive mechanism, a groove with three non-inclined groove portions, and two inclined groove portions connecting the non-inclined groove portions, could correspond to three different gear modes, such as a propulsion mode, a torque vectoring mode, and a neutral gear mode.

With reference to FIGS. 7 through 10 of the drawings, another axle assembly 10d constructed in accordance with the teachings of the present disclosure is illustrated. The axle assembly 10d can include a torque distribution drive mechanism 14d that can similar to the torque distribution drive mechanism 14a of FIG. 1 except as noted. As such, reference numerals employed in FIG. 1 will be employed to indicate corresponding elements in FIGS. 7 through 10.

In lieu of the drive member 32 and the reduction gear 88 that are employed in FIG. 1 (the drive member 32 and reduction gear 88 being arranged about a rotational axis that is parallel to the rotational axes of the differential carrier 83 and the first planet carrier 56), the example of FIGS. 7 through 10 employs a drive member 32d and a reduction gear 88d that are arranged about a rotational axis 1300 that is perpendicular to the rotational axes 85 of the differential carrier 83 and the first planet carrier 56. For example, the rotational axis 1300 can be orthogonal to a rotational axis 1304 of an engine 120 (or other means for providing rotary power, such as an electric or hydraulic motor) and the rotational axes 85 of the differential carrier 83 and the first planet carrier 56. The engine 120 can drive an input pinion 1306 (e.g., via a propshaft (not shown)) that is meshed with a ring gear 1308 that can be coupled to the differential carrier 83 in a conventional manner.

Configuration of the torque distribution drive mechanism 14d in this manner may be advantageous in some situations when space for packaging the torque distribution drive mechanism into a vehicle is limited.

The drive member 32d can be any type of motor, such as an AC electric motor or a DC electric motor, and can have an output shaft 37d-1 to which the reduction gear 88d can be rotatably coupled.

The reduction gear 88d can be a worm 1312 that can be meshingly engaged to a worm gear 1314. The worm gear 1314 can be rotatably coupled to the first ring gear 54d (e.g., formed on an outer surface of the first ring gear 54d). The worm 1312 and worm gear 1314 can be relatively small in size but nonetheless provide a relatively large gear reduction ratio. Consequently, the drive member 32d can be configured to produce a relatively high-speed, low torque output and as such, can be relatively smaller in diameter than the drive member 32 of FIG. 1.

If desired, the worm 1312 and worm gear 1314 can be configured to be self-locking when the drive member 32d is not actively powered to effectively lock the differential assembly 36d to inhibit speed differentiation between the first and second output members 16 and 18. In this regard, locking of the worm 1312 and worm gear 1314 inhibits rotation of the first ring gear 54d. Since the second planet carrier 76d and the differential carrier 83 are coupled for rotation, rotation of the differential carrier 83 (via rotation of the differential ring gear 1308 resulting from rotation of the input pinion 1306) can provide a rotary input to the second planet carrier 76d, which causes the second planet gears 72 of the second planetary gear set 42 to rotate within the second ring gear 74 and rotate the second sun gear 70. Rotation of the second sun gear 70 causes rotation of the first sun gear 50, causing rotation of the first planet gears 52 of the first planetary gear set 40, which, in turn, causes the first planet carrier 56 to rotate. Since the first planet carrier 56 is coupled to the first output member 16, and since the first and second planetary gear sets 40 and 42 have identical gear reduction ratios, the first and second planet carriers 56 and 76 rotate at the same rate (i.e., at the rate at which the differential carrier 83 rotates). As such, the first output member 16 cannot rotate relative to the differential carrier 83 so that the differential gear set 104 is locked to the differential carrier 83.

For the worm 1312 and worm gear 1314 to be self-locking, the worm gear 1314 cannot "back drive" the worm 1312. As those of skill in the art will appreciate, the ability for the worm 1312 and worm gear 1314 to lock depends on several factors, including the lead angle, the pressure angle and the coefficient of friction, but often times the analysis can be reduced to a rough approximation involving the coefficient of friction and the tangent of the lead angle (i.e., self locking if tangent of the lead angle<coefficient of friction).

Figure 7:
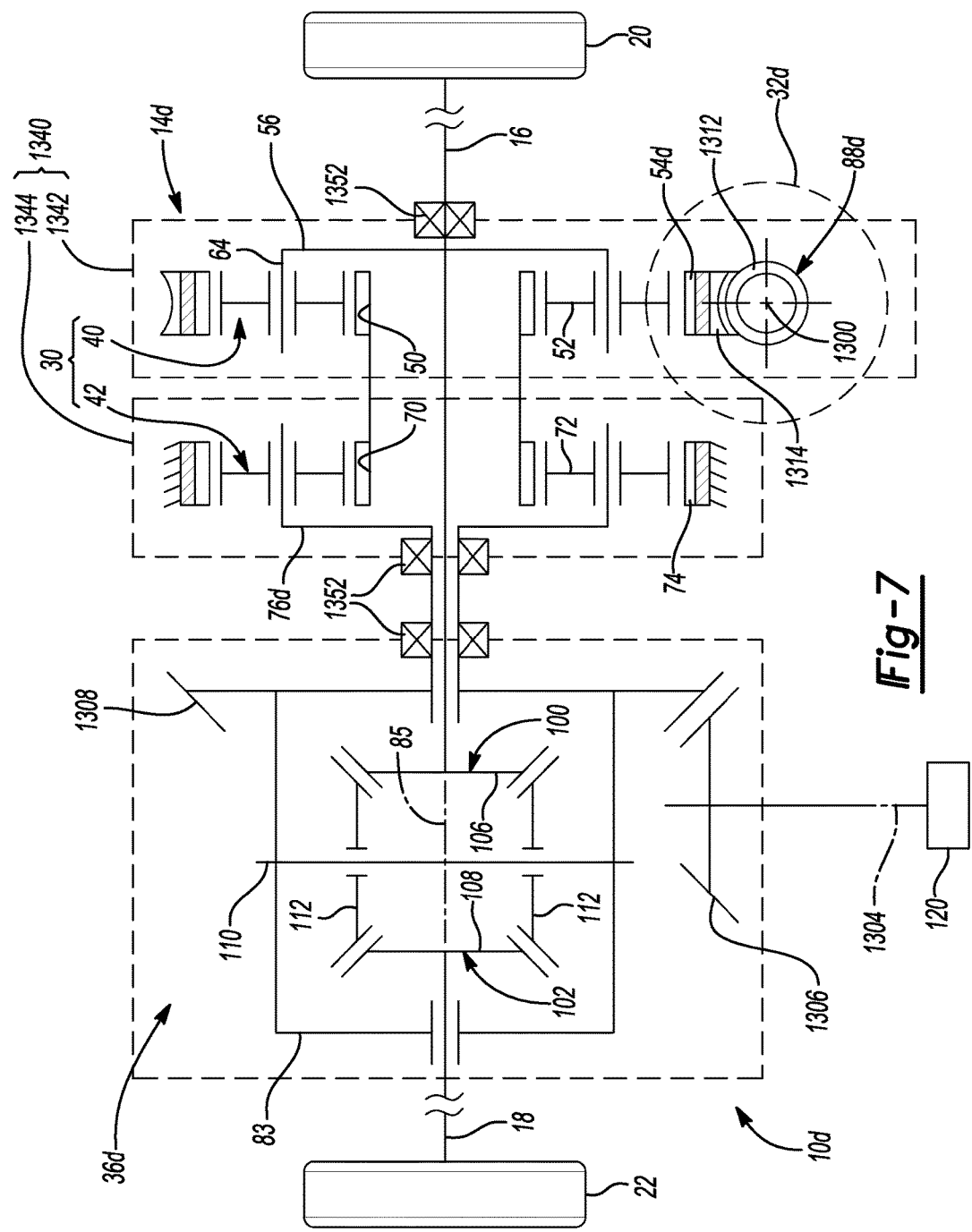
FIG. 7 diagrammatically illustrates a cross-sectional view of a torque distribution drive mechanism according to a fourth embodiment.
Figure 8:
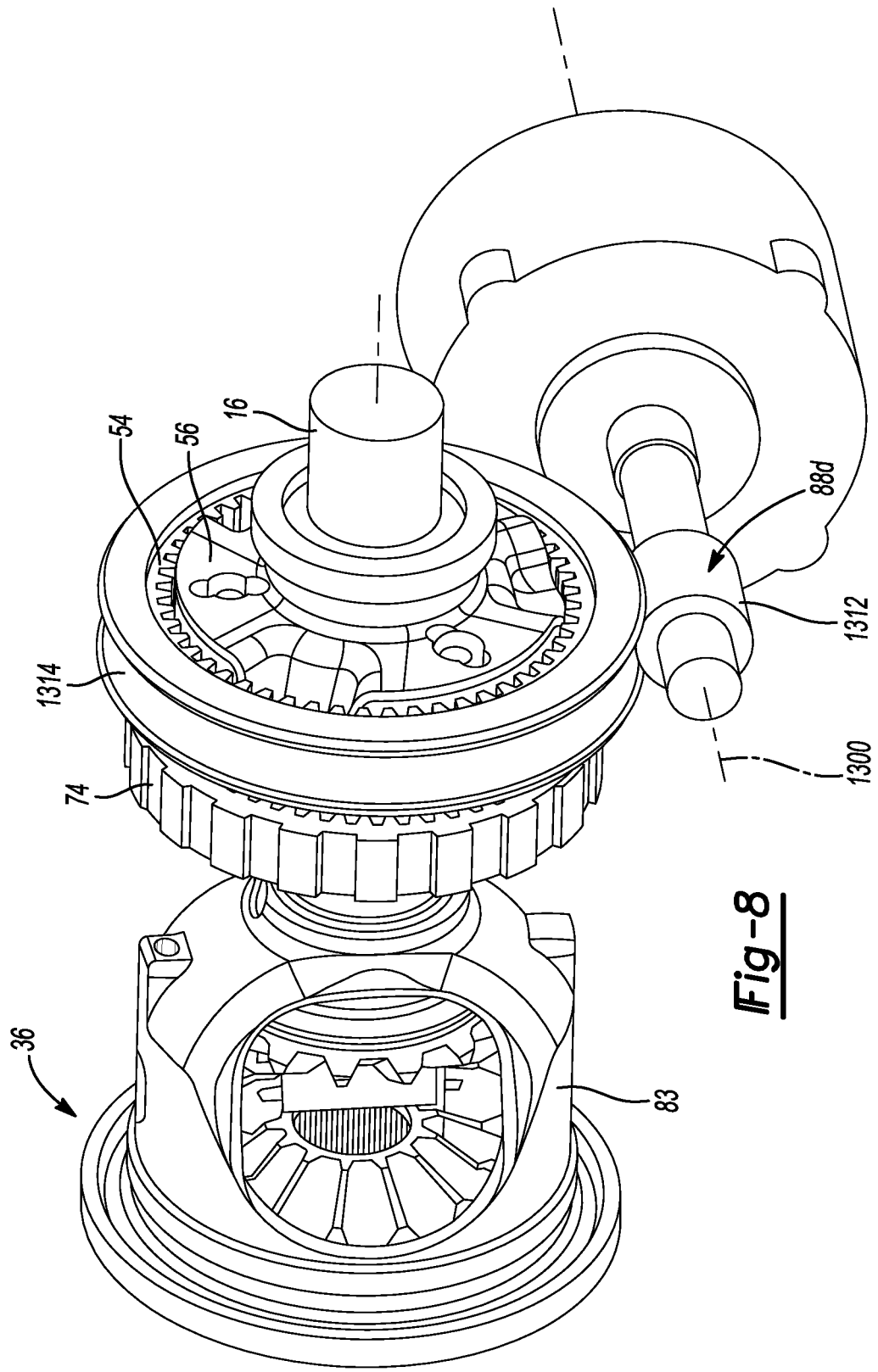
FIG. 8 is a perspective view of a portion of the torque distribution drive mechanism of FIG. 7.
Figure 9:
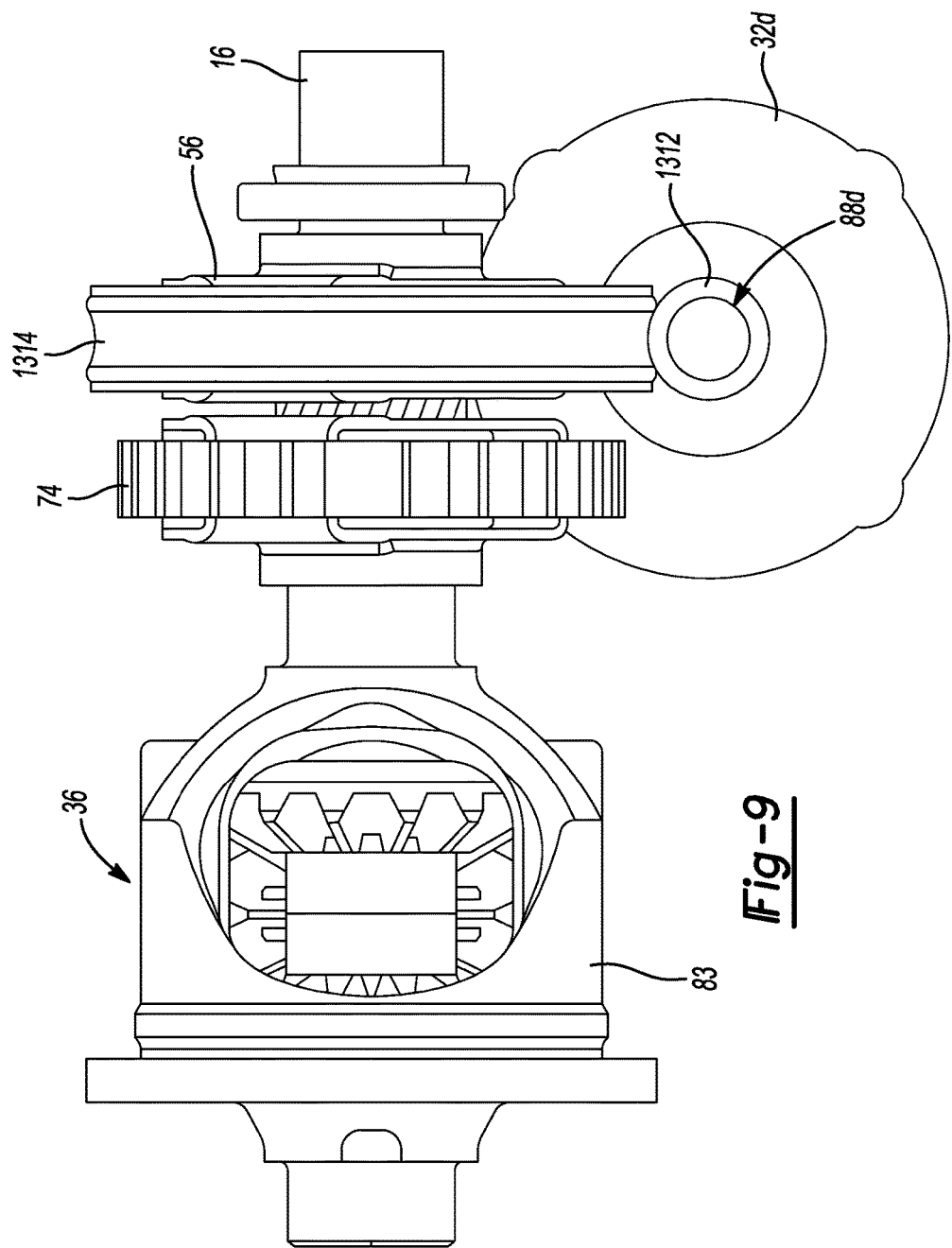
FIG. 9 is a rear elevation view of a portion of the torque distribution drive mechanism of FIG. 7.
Figure 10:
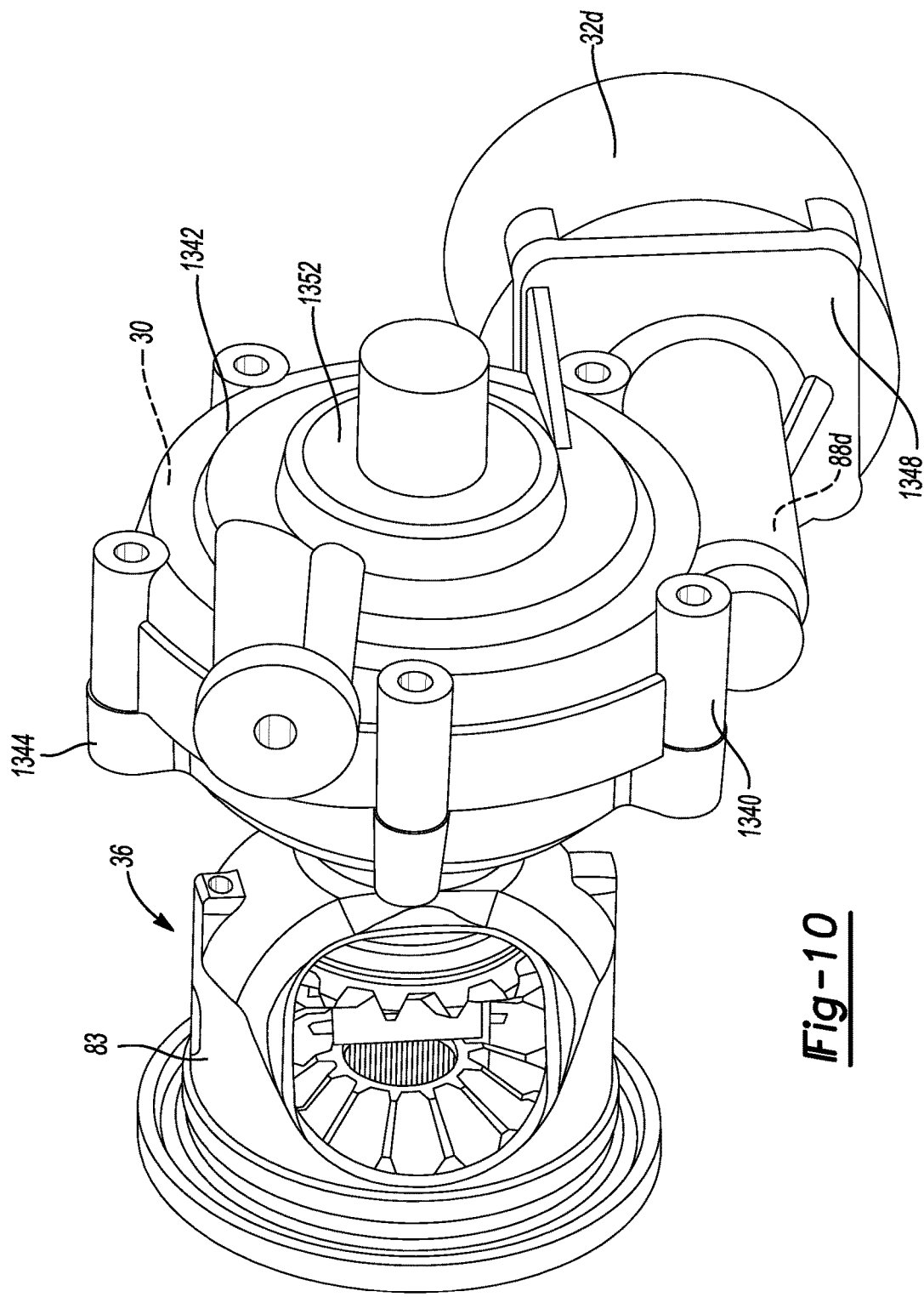
FIG. 10 is a perspective view of a portion of the torque distribution drive mechanism of FIG. 7.

With specific reference to FIGS. 7 and 10, the dual planetary gear set 30 and the reduction gear 88d can be housed in a housing 1340 that can comprise a first housing shell 1342 and a second housing shell 1344 that are fixedly coupled to one another via a set of fasteners (not shown). The drive member 32d can be mounted to a flange 1348 formed on the first housing shell 1342. Seals 1352 can be employed to seal the interface between the housing 1340 and the first output member 16 and between the housing 1340 and the portion of the second planet carrier 76d that is rotatably coupled to the differential carrier 83. Additionally, a seal 1354 can be received in the housing 1356 in which the differential carrier 83 is disposed to seal the interface between the housing 1356 and the portion of the second planet carrier 76d that is rotatably coupled to the differential carrier 83.

Figure 11:
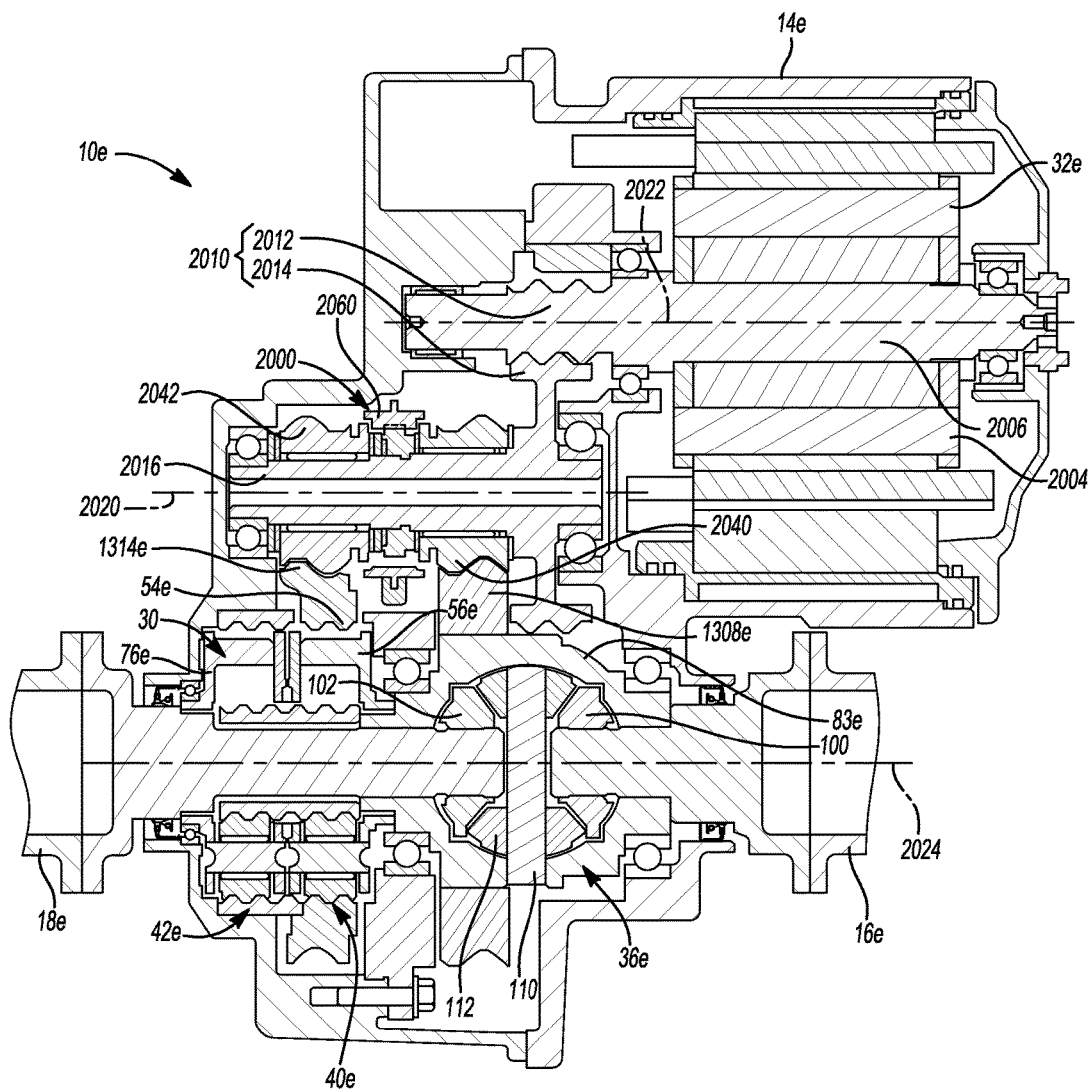
FIG. 11 is a longitudinal section view of a portion of another axle assembly constructed in accordance with the teachings of the present disclosure.
Figure 12:
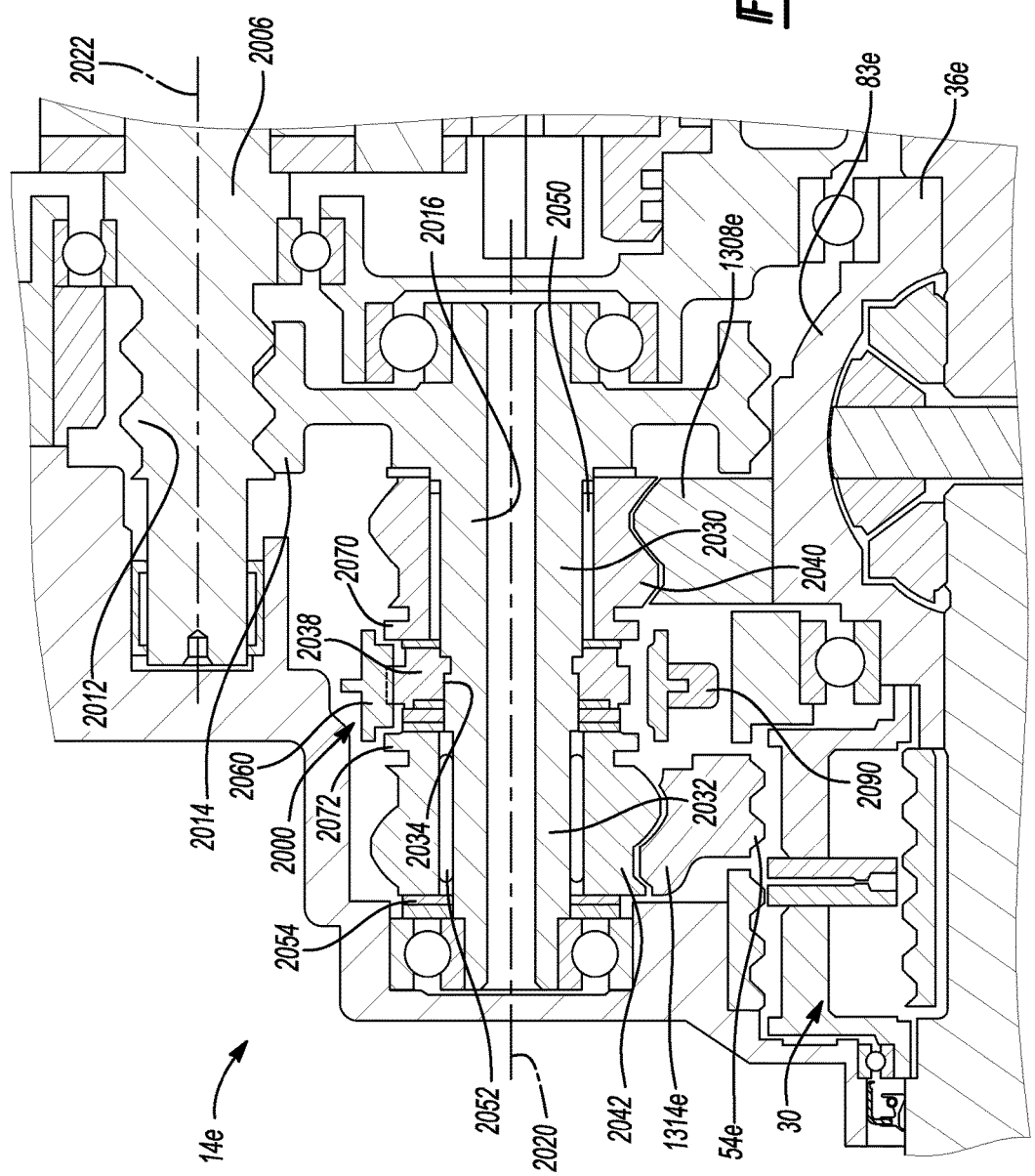
FIG. 12 is an enlarged portion of FIG. 11.

In FIGS. 11 and 12 of the drawings, portion of another axle assembly 10e constructed in accordance with the teachings of the present disclosure is illustrated. The axle assembly 10e can include a torque distribution drive mechanism 14e that can be somewhat similar to the drive mechanism 14d of FIG. 7, except that the drive member 32e and a clutch mechanism 2000 cooperate to alternately provide rotary power that is employed by the differential assembly 36e for propulsive power or for the dual planetary gear set 30 for torque vectoring control of the first and second output members 16e and 18e.

The drive mechanism 32e can comprise any type of motor, such as a DC electric motor 2004, and can have an output shaft 2006 that can be selectively operated to provide rotary power to a reduction drive 2010. The reduction drive 2010 can include a first pinion gear 2012, which can be mounted to the output shaft 2006 for rotation therewith, and a second pinion gear 2014 that can be mounted to an intermediate shaft 2016 for rotation therewith. The intermediate shaft 2016 can be disposed along an intermediate axis 2020 that is generally parallel to an output shaft axis 2022 about which the output shaft 2006 of the motor 2004 rotates. The intermediate axis 2020 and the output shaft axis 2022 can be parallel to an axis 2024 about which the differential assembly 36e and the first and second output members 16e and 18e rotate. In the particular example provided, the intermediate axis 2020, the output shaft axis 2022 and the axis 2024 are disposed in a common plane, but it will be appreciated that one or both of the intermediate axis 2024 and the output shaft axis 2022 can be positioned differently. Moreover, it will be appreciated that one or more spaced apart from the axis 2024 so that one of the axes 2020, 2022 and 2024 will not lie in a common plane. While the reduction drive 2010 has been described and illustrated as having but a single pair of gears, it will be appreciated that the reduction drive could alternatively comprise additional gears disposed in a gear train between the first pinion gear 2012 and the second pinion gear 2014.

With specific reference to FIG. 12, the intermediate shaft 2016 can have a first journal portion 2030, a second journal portion 2032 and a drive portion 2034 that can be disposed between the first and second journal portions 2030 and 2032. The drive portion 2034 can have a plurality of external splines or teeth that can be meshingly engaged to a plurality of internal splines or teeth that can be formed on a drive member 2038. A first intermediate output gear 2040 can be rotatably received on the first journal portion 2030 and a second intermediate output gear 2042 can be rotatably received on the second journal portion 2032. Bearings 2050 and 2052 can be received between the first and second journal portions 2030 and 2032 and the first and second intermediate output gears 2040 and 2042, respectively. Thrust bearings 2054 can be disposed along the length of the intermediate shaft 2016 at various locations to help promote relative rotation between the drive member 2038 and the first and second intermediate output gears 2040 and 2042.

The first intermediate output gear 2040 can be meshingly engaged to the ring gear 1308e of the differential assembly 36e. As the ring gear 1308e is fixedly coupled to the differential carrier 83e for common rotation, it will be appreciated that rotation of the first intermediate output gear 2040 can cause corresponding rotation of the ring gear 1308e and the differential carrier 83e, and that rotation of the differential carrier 83e can similarly cause corresponding rotation of the first intermediate output gear 2040. The second intermediate output gear 2042 can be meshingly engaged to an input gear 1314e that is formed on the first ring gear 54e. Accordingly, rotation of the second intermediate output gear 2042 can cause corresponding rotation of the input gear 1314e and the first ring gear 54e.

The clutch mechanism 2000 can be employed to control operation of the torque distribution drive mechanism 14e in a neutral condition (shown), a propulsion mode or a torque-vectoring mode. The clutch mechanism 2000 can include a clutch collar 2060 having a set of internal teeth that can be meshingly engaged to a set of external teeth formed on the drive member 2038. Accordingly, rotation of the intermediate shaft 2016 will cause corresponding rotation of the clutch collar 2060. A first set of clutch teeth 2070 can be formed on the first intermediate output gear 2040 and a second set of clutch teeth 2072 can be formed on the second intermediate output gear 2042. The clutch collar 2060 can be shifted axially along the intermediate axis 2020 such that the set of internal teeth formed on the clutch collar 2060 are engaged with the first set of clutch teeth 2070 (to thereby couple the first intermediate output gear 2040 to the intermediate shaft 2016 for common rotation), or such that the set of internal teeth formed on the clutch collar 2060 are engaged with the second set of clutch teeth 2072 (to thereby couple the second intermediate output gear 2042 to the intermediate shaft 2016 for common rotation), or such that the set of internal teeth formed on the clutch collar 2060 are not engaged to either the first set of clutch teeth 2070 or the second set of clutch teeth 2072 (so that neither of the first and second intermediate output gears 2040 and 2042 is coupled to the intermediate shaft 2016 for rotation therewith).

Any type of actuator can be employed to axially move the clutch collar 2060 along the intermediate axis 2020. In the particular example provided, a clutch fork 2090 is employed to control the axial position of the clutch collar 2060.

Operation of the clutch mechanism 2000 in a first mode (i.e., propulsion mode) can couple the first intermediate output gear 2040 to the intermediate shaft 2016 (via the clutch collar 2060) to thereby drive the ring gear 1308e of the differential assembly 36e. As will be appreciated, rotation of the ring gear 1308 drives the differential carrier 83e and the cross-pin 110 for rotation about the output axis 2024. Pinion gears 112 are rotatably disposed on the cross-pin 110 and meshingly engaged with first and second side gears 100 and 102. The first side gear 100 is drivingly engaged to the first output member 16e and the second side gear 102 is drivingly engaged to the second output member 18e. In this mode, the dual planetary gearset 30 does not effect operation of the differential assembly 36e and as such, the differential assembly 36e provides rotary power to the first and second output members 16e and 18e in the manner of a standard open differential assembly.

Operation of the clutch mechanism 2000 in a second mode (i.e., torque vectoring mode) can couple the second intermediate output gear 2042 to the intermediate shaft 2016 (via the clutch collar 2060) to thereby drive the input gear 1314e and the first ring gear 54e of the dual planetary transmission 30. In this embodiment, rotary power is output from the first planetary gearset 40e to the differential carrier 83e (via the first planet carrier 56e) and rotary power is output from the second planetary gearset 42e to the second output member 18e (via the second planet carrier 76e). As the second output member 18e is non-rotatably coupled the second side gear 102, it will be appreciated that the second planet carrier 76e is also drivingly coupled to the second side gear 102. Those of skill in the art will appreciate from this disclosure that the dual planetary transmission 30 can be employed to impose an equal but opposite torque difference on the first and second output members 16e and 18e and that the amount of torque applied to a given one of the output members is dependent upon the direction in which the motor 2004 is operated.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
   first and second axle shafts;
   a differential assembly having a differential carrier and first and second differential outputs received in the differential carrier that are rotatable about an output axis, the first differential output being drivingly coupled to the first axle shaft, the second differential output being drivingly coupled to the second axle shaft;
   a housing; and
   a transmission received in the housing, the transmission having first and second planetary gearsets, the first planetary gearset having a first ring gear, a first planet carrier and a first sun gear, the first planet carrier being coupled to one of the differential carrier and the second axle shaft for common rotation, the second planetary gearset having a second ring gear, a second planet carrier and a second sun gear, the second planet carrier being coupled to the other one of the differential carrier and the second axle shaft for common rotation, the second sun gear being coupled to the first sun gear for common rotation, wherein one of the first and second ring gears is fixedly coupled to the housing.

2. The axle assembly of claim 1, further comprising a motor and reduction gearset coupled to the housing, the motor and reduction gearset being selectively operable for driving the second ring gear.

3. The axle assembly of claim 2, further comprising:
   a bevel ring gear coupled to the differential carrier for common rotation; and
   an input pinion meshingly engaged to the bevel ring gear.

4. The axle assembly of claim 3, wherein the motor and reduction gearset comprises a worm and a worm gear.

5. The axle assembly of claim 4, wherein the worm is formed on the outer periphery of the second ring gear.

6. The axle assembly of claim 2, wherein the motor and reduction gearset comprises first and second gears that are meshingly engaged to one another and wherein the first and second gears are disposed for rotation about respective rotational axes that are parallel to one another, and wherein the rotational axis of the first gear is parallel to the output axis.

7. The axle assembly of claim 6, wherein the rotational axes of the first and second gears and the output axis are disposed in a common plane.

8. The axle assembly of claim 2, further comprising a clutch that is selectively operable in a first mode for transmitting rotary power between the motor and reduction gearset and the differential carrier.

9. The axle assembly of claim 8, wherein the clutch comprises a collar that is axially slidable along the output axis.

10. The axle assembly of claim 8, wherein the clutch is selectively operable in a second mode for driving the other one of the first and second ring gears.

11. An axle assembly comprising:
first and second axle shafts;
a differential assembly having a differential carrier and first and second differential outputs received in the differential carrier that are rotatable about an output axis, the first differential output being drivingly coupled to the first axle shaft, the second differential output being drivingly coupled to the second axle shaft;
a housing; and
a transmission received in the housing, the transmission having a pair of planetary gearsets, each of the planetary gearsets having a ring gear, a planet carrier and a sun gear, wherein one of the ring gears is non-rotatably coupled to the housing, wherein one of the planet carriers is coupled for rotation with one of the first and second differential outputs and the other one of the planet carriers is coupled to the differential case for rotation therewith, and wherein the sun gears are non-rotatably coupled to one another.

12. The axle assembly of claim 11, further comprising a motor and reduction gearset coupled to the housing, the motor and reduction gearset being selectively operable for driving the ring gear that is not non-rotatably coupled to the housing.

13. The axle assembly of claim 12, wherein the motor and reduction gearset comprises a worm and a worm gear.

14. The axle assembly of claim 13, wherein the worm is formed on the outer periphery of the ring gear that is not non-rotatably coupled to the housing.

15. The axle assembly of claim 12, wherein the motor and reduction gearset comprises first and second gears that are meshingly engaged to one another and wherein the first and second gears are disposed for rotation about respective rotational axes that are parallel to one another, and wherein the rotational axis of the first gear is parallel to the output axis.

16. The axle assembly of claim 15, wherein the rotational axes of the first and second gears and the output axis are disposed in a common plane.

17. The axle assembly of claim 11, further comprising a clutch that is selectively operable in a first mode for transmitting rotary power between the motor and reduction gearset and the ring gear that is not non-rotatably coupled to the housing.

18. The axle assembly of claim 17, wherein the clutch comprises a collar that is axially slidable along the output axis.

19. The axle assembly of claim 17, wherein the clutch is selectively operable in a second mode for driving the differential carrier.

20. The axle assembly of claim 19, wherein the clutch locks the transmission when the clutch is operated in the second mode.

21. The axle assembly of claim 11, further comprising:
a bevel ring gear coupled to the differential carrier for common rotation; and
an input pinion meshingly engaged to the bevel ring gear.

* * * * *